United States Patent [19]

Yanagisawa et al.

[11] Patent Number: 4,501,352
[45] Date of Patent: Feb. 26, 1985

[54] WORK-CONVEYING APPARATUS

[75] Inventors: Taminori Yanagisawa; Takaharu Yamaguchi; Hiroshi Fukatsu, all of Toyota, Japan

[73] Assignees: Toyota Jidosha Kabushiki Kaisha; Taiho Seiki Kabushiki Kaisha, both of Toyota, Japan

[21] Appl. No.: 480,035

[22] Filed: Mar. 29, 1983

[30] Foreign Application Priority Data

Mar. 29, 1982 [JP]  Japan .............................. 57-44233[U]

[51] Int. Cl.³ ............................................ B65G 25/00
[52] U.S. Cl. .................................... 198/775; 414/222; 414/749; 74/55
[58] Field of Search ................ 198/485, 775; 414/222, 414/749; 74/50, 55; 198/750

[56] References Cited

U.S. PATENT DOCUMENTS

| 2,117,523 | 5/1938 | Strohl | 414/749 |
| 3,473,643 | 9/1969 | Janiske | 198/775 |
| 3,753,489 | 8/1973 | Tomioka | 198/750 |
| 3,988,937 | 11/1976 | Higuchi | 414/749 |

Primary Examiner—Joseph E. Valenza
Assistant Examiner—Douglas C. Voorhees
Attorney, Agent, or Firm—Cushman, Darby & Cushman

[57] ABSTRACT

A work-conveying apparatus which conveys a work stably and without fail from the receipt of the work transferred from a conveying apparatus in the previous step to the transfer of the work to a conveying apparatus in the next step.

7 Claims, 3 Drawing Figures

WORK-CONVEYING APPARATUS

BACKGROUND OF THE INVENTION

1. Field of the Invention

The present invention relates to a work-conveying apparatus which is most suitable for the use of conveying a work between the press apparatuses.

2. Description of Prior Art

In the conventional work-conveying apparatuses, a work conveyed from a press apparatus has been forwarded to a carrying-in apparatus as a next step by a belt conveyor. After determining the width of the work, the work has been placed on a metal pattern by a carrying-in pusher. However, there have been instability and uncertainty in placing the work on the pattern. Furthermore, the automization could not be realized due to the shape of the work, so that it has been obliged to manually place the work on the pattern. Moreover, it has taken much time to adjust a pusher, chute, guidance of a pattern at the initial rising point.

Also, in another conventional apparatuses, it has been tried to dissolve the problems of the above-mentioned apparatuses by changing the above-mentioned conveyor to a chain conveyor equipped with pawls having predetermined pitch, whereby eliminating the determining of the position of the work prior to the carrying-in the work. However, in such an apparatus, when the press-pattern was changed, it was impossible to move the conveyor since a chain conveyor extends almost so as to be contacted to the metal pattern. Therefore, such an apparatus could be applied only to a press in a type of taking out the metal pattern in the direction of the presser guide. Moreover, when a conveyor in a type of the endless chain was used, it was hard to keep the stability in a long life of use because of elongation of the chain.

SUMMARY OF THE INVENTION

The present invention has been accomplished in light of the problems in the conventional art mentioned above.

The main object of the present invention is to provide a work-conveying apparatus which conveys a work stably and without fail from the receipt of the work conveyed from a conveying apparatus in the previous step to the transfer of the work to a conveying apparatus in the next step.

Still main object of the present invention is to provide a work-conveying apparatus which is characterized in that a carriage guide on which a carriage slides is provided; direction-regulating guide on which a slider slides is provided along the direction at a certain angle with respect to the carriage guide; a crank is provided so as to rotate centering around the intersecting point of the providing direction of the carriage guide and the direction-regulating guide; a connecting link is rotatably connected to the tip portion of the crank at the first pivot point, to the carriage at the second pivot point and to the slider at the third pivot point; and a straight line connecting the first pivot point and the second pivot point crosses, at right angle, a straight line connecting the first pivot point and the third pivot point, and moreover, the distance between the first pivot point and the second pivot point and the distance between the first pivot point and the third pivot point are both equal to the distance between the rotating center of the crank and the first pivot point.

Another object of the present invention is to provide a work-conveying apparatus which can obtain smooth termination since the direct feeding movement is carried out by the crank which rotates 360°.

Still another object of the present invention is to provide a work-conveying apparatus which is compact in a size of the whole apparatus because stroke of four times of the radius of the crank can be obtained due to the employment of crank mechanism and link mechanism.

Still another object of the present invention is to provide a work-conveying apparatus which is less restriction to the transferring level by the size of press machines, contracted depth of a work, etc. when it is used among the press machines because the height of the apparatus is low.

Still another object of the present invention is to provide a work-conveying apparatus which readily conducts maintenance of each machines, devices, and parts, and incorporates additional devices in the apparatus since a simple lifter can be incorporated around or in the apparatus.

DETAILED DESCRIPTION OF THE PREFERRED EMBODIMENT

Figure 1:
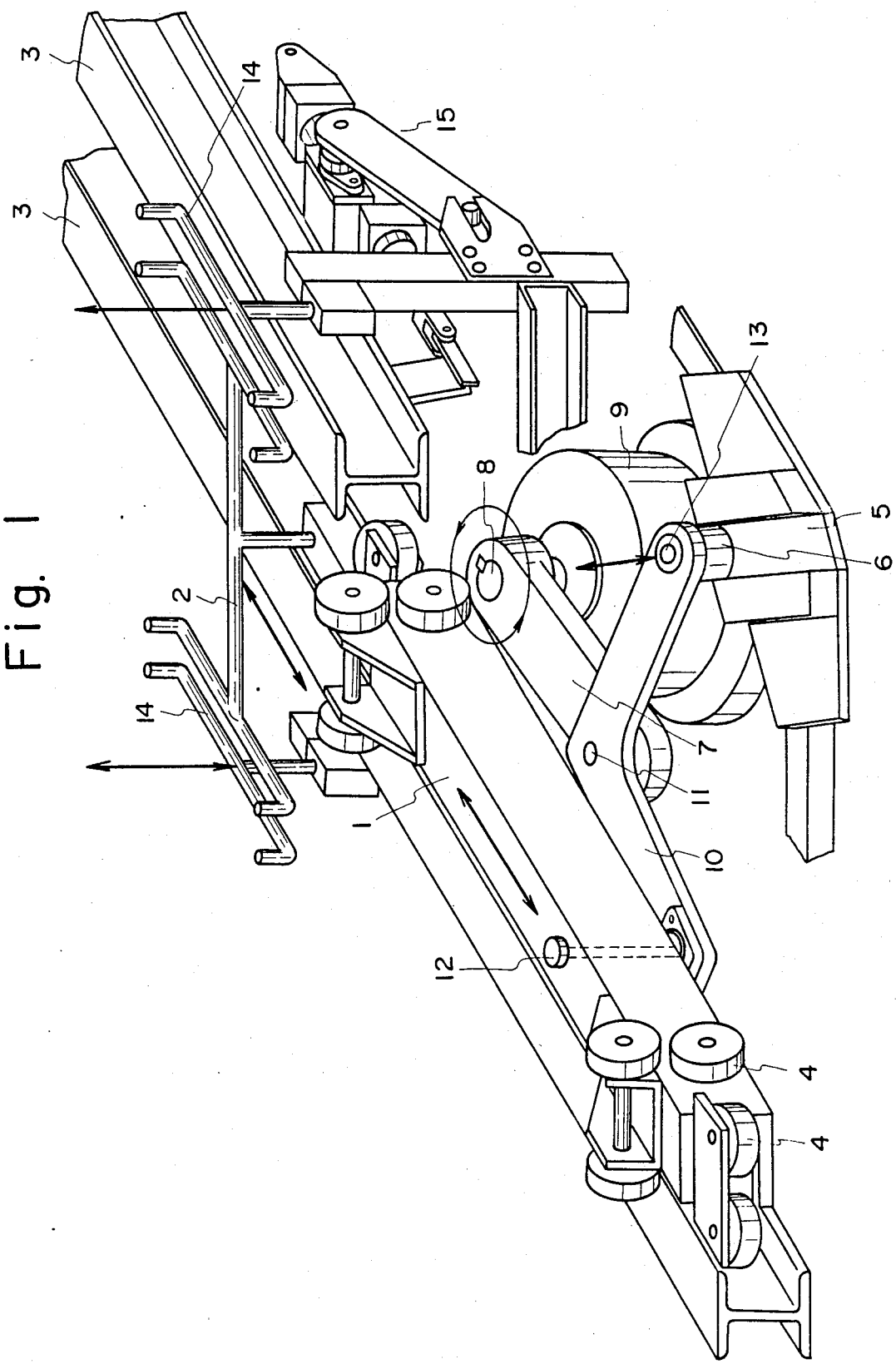
FIG. 1 is a partially cutaway perspective view of one of examples according to the present invention.
Figure 2:
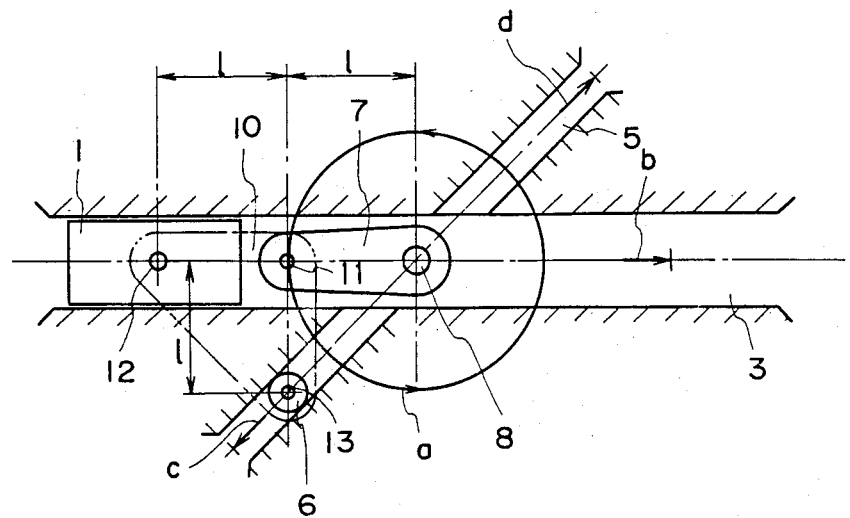
FIG. 2 is an explanatory view showing the operation of the present invention.

In FIGS. 1 and 2, the reference numeral 1 is a carriage equipped with a work-receipt 2 for receiving a work (not shown). The carriage 1 slides on a carriage guide rail 3 as a carriage guide via carriage guide rollers 4. A direction-regulating guide 5 is provided at an angle of 45° with respect to the carriage guide rail 3. A roller 5 as a slider slides on the direction-regulating guide 5. Reference numeral 7 is a crank which horizontally turns by means of a driving source 9 centering around an axis 8 provided at an intersecting point of the providing direction of the carriage guide rail 3 and the direction-regulating guide 5. A connecting link 10 is rotatably connected to the tip portion of the crank 7 by a pin 11 as the first pivot point, to the carriage 1 by a pin 12 as the second pivot point and to the roller 6 by a pin 13 as the third pivot point. A straight line connecting the pin 11 and the pin 12 crosses, at the right angle, a straight line connecting the pin 11 and the pin 13. And the distance between the pin 11 and the pin 12 and the distance between the pin 11 and the pin 13 are both equal to the distance l between the axis 8 of the crank 7 and the pin 11. A holder 14 for positioning the work is vertically moved by a lifter 15.

Now, when the crank 7 starts to rotate centering around the axis 8 as shown by an arrow a in FIG. 2, the carriage 1 is pulled via the connecting link 10 to slide within the carriage guide rail 3 in the direction as shown by an arrow b. At this time, the roller 6 slides within the direction-regulating guide 5 in the direction as shown by an arrow c. When the crank 7 rotates to 90°, the pin 12 of the carriage 1 is positioned at the axis 8. Said point becomes dead point in the relationship between the crank 7 and the carriage 1. At this time, however, the roller 6 starts the motion to return to the axis 8 which is the rotating center and a force which makes the roller 6 slide in the direction as shown by an arrow d, acts on the roller 6, so that its component force in the lateral direction makes the carriage 1 slide in the direction of the arrow b. Accordingly, the carriage 1 smoothly passes through the dead point without any hindrance.

When the crank 7 rotates to 180°, the carriage 1 reaches to the most removed point (at the right end in FIG. 2). At this time, the roller 6 is positioned at the direction-regulating guide 5 on the opposite side in FIG. 2, so that when the crank 7 rotates from 180° to 360°, the carriage 1 returns to the initial position while making the reverse movement from the above-mentioned movement. That is, the stroke of the carriage 1 of the present invention is four times of the radius of the crank.

Figure 3:
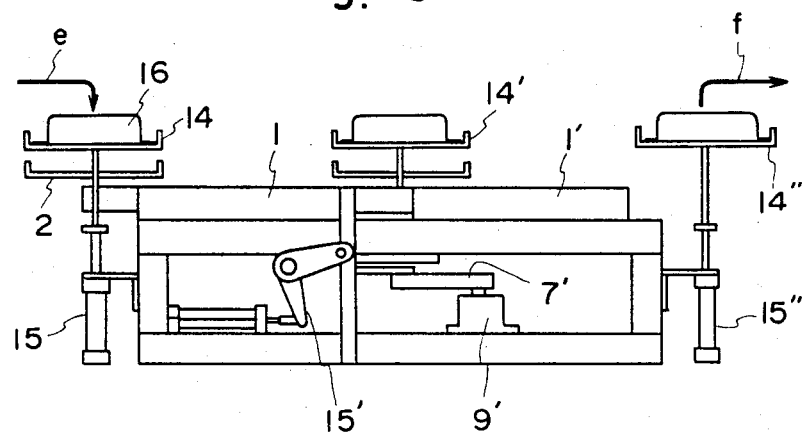
FIG. 3 is a side view showing the state that the present invention is used.

Next, the state of using the present invention is explained in mainly referring to FIG. 3. In this example, two carriages are used.

First, a work 16 transferred from the previous step as shown by the arrow e is received by a holder 14 for positioning the work by means of the actuation of the first lifter 15. After the lowering of the first holder 14 for positioning the work, the work 16 is mounted on the work-receipt 2 fixed on the first carriage 1. When the work 16 is delivered onto the carriage 1, the carriage 1 advances (advances to the right in the drawing) after the recognition of the work at the predetermined position and stops after the crank 7 (the crank for the first carriage is not shown) rotates to 180°. After the recognition of the advanced end of the carriage which transferred the work 16, the second lifter 15' actuates and the second holder 14' for positioning the work lifts up to raise the work 16 on the work-receipt 2. When the holder 14' for positioning the work receives the work 16, the first carriage 1 returns to the initial awaiting position after the recognition of the lifted end of the second holder 14'. At this time, the crank 7 rotates from the position of 180° to that of 360°. Synchronously with the return of the first carriage 1, the second carriage 1' reverses (to the left side in the drawing) and a work-receipt on the carriage 1' comes right under the second holder 14' for positioning the work. At this time, the second lifter 15' actuates and the second holder 14' for positioning the work is lowered to mount the work on a work-receipt on the carriage 1'. Thereafter, as the same case of the first carriage 1, the driving source 9' actuates after the recognition of the work and the crank 7' turns to 180°; and the carriage 1' stops at the most advanced end. At that position, the third lifter 15" actuates and the third holder 14" for positioning the work lifts up to receive the work 16 on the work-receipt and to lift up it. Then, as shown by an arrow f, the work 16 is transferred to the next step in the apparatus. Thereafter, the second carriage 1' reverses so as to receive a work 16 transferred by the first carriage 1; and the afore-mentioned movements are repeated.

In this example, stroke of the carriage is 1500 mm. Depending on the distances between the machines and apparatuses, however, it goes without saying that such a stroke and the number of carriage could be appropriately selected. Moreover, in case that plural apparatuses according to the present invention are used, the lifters can be provided separately. Alternatively, they can be used together with the present apparatuses as united parts. Furthermore, the lifter in vicinity of the press machine may be incorporated in the press machine, etc. as a separate device from the present apparatus. Alternatively, a device inside of the press machines, etc. may be utilized as a lifter without especially providing a lifter.

According to the present invention as mentioned above, the following effects can be exerted.

Since the direct feeding movement is carried out by the crank which turns 360°, the smooth termination can be obtained and feeding accuracy is high even at the high speed operation. Moreover, since the crank mechanism and link mechanism are employed, stroke which is four times of the radius of the crank can be obtained so that the apparatus as a whole can be designed to be in a compact size. The height of the apparatus is low, so that when the apparatus is used among press machines, there is less restriction to the transferring level by the size of the press machines, contracted depth of the work and so forth. Since a simple lifter can be incorporated in the front, in the rear and in the center, etc. of the present apparatus, maintenance of each devices, machines and parts can be easily carried out and, if desired, a reversing device can be readily incorporated.

What is claimed is:

1. A work-conveying apparatus comprising:
   a carriage,
   a carriage guide on which the carriage slides,
   a direction-regulating guide on which a slider slides, provided along the direction at a certain angle with respect to the carriage guide,
   a crank provided so as to rotate centering around the intersecting point of the providing direction of the carriage and the direction-regulating guide,
   a connecting link rotatably connected to the tip portion of the crank at the first pivot point, to the carriage at the second pivot point and to the slider at the third pivot point, wherein a straight line connecting the first pivot point and the second pivot point crosses, at right angle, a straight line connecting the first pivot point and the third pivot point, and the distance between the first pivot point and the second pivot point and the distance between the first pivot point and the third pivot point are both equal to the distance between the rotating center of the crank and the first pivot point.

2. A work-conveying apparatus as claimed in claim 1, wherein the direction-regulating guide is provided along the direction at the angle of 45° with respect to the carriage guide.

3. A work-conveying apparatus as claimed in claim 1, wherein the carriage guide is a carriage guide rail.

4. A work-conveying apparatus as claimed in claim 1, wherein the slider is a roller.

5. A work-conveying apparatus as claimed in claim 1, wherein the drive of the crank is conducted by a driving source connected through an axis.

6. A work-conveying apparatus as claimed in claim 1, 4 or 5, wherein the link and the crank, the link and the carraige, and the like and the roller are rotatably connected by respective pins.

7. A work-conveying apparatus as claimed in claim 1 further comprising a holder for positioning the work and a lifter.

* * * * *